June 5, 1934. R. FLIGHT 1,962,064
MEANS FOR SIMPLIFYING THE CHANGING OF THE GEAR RATIO IN AUTOMOBILES
Filed Nov. 26, 1930 3 Sheets-Sheet 1

INVENTOR
R. FLIGHT
ATTY.

June 5, 1934. R. FLIGHT 1,962,064
MEANS FOR SIMPLIFYING THE CHANGING OF THE GEAR RATIO IN AUTOMOBILES
Filed Nov. 26, 1930 3 Sheets-Sheet 2

INVENTOR
R. FLIGHT
By
ATTY.

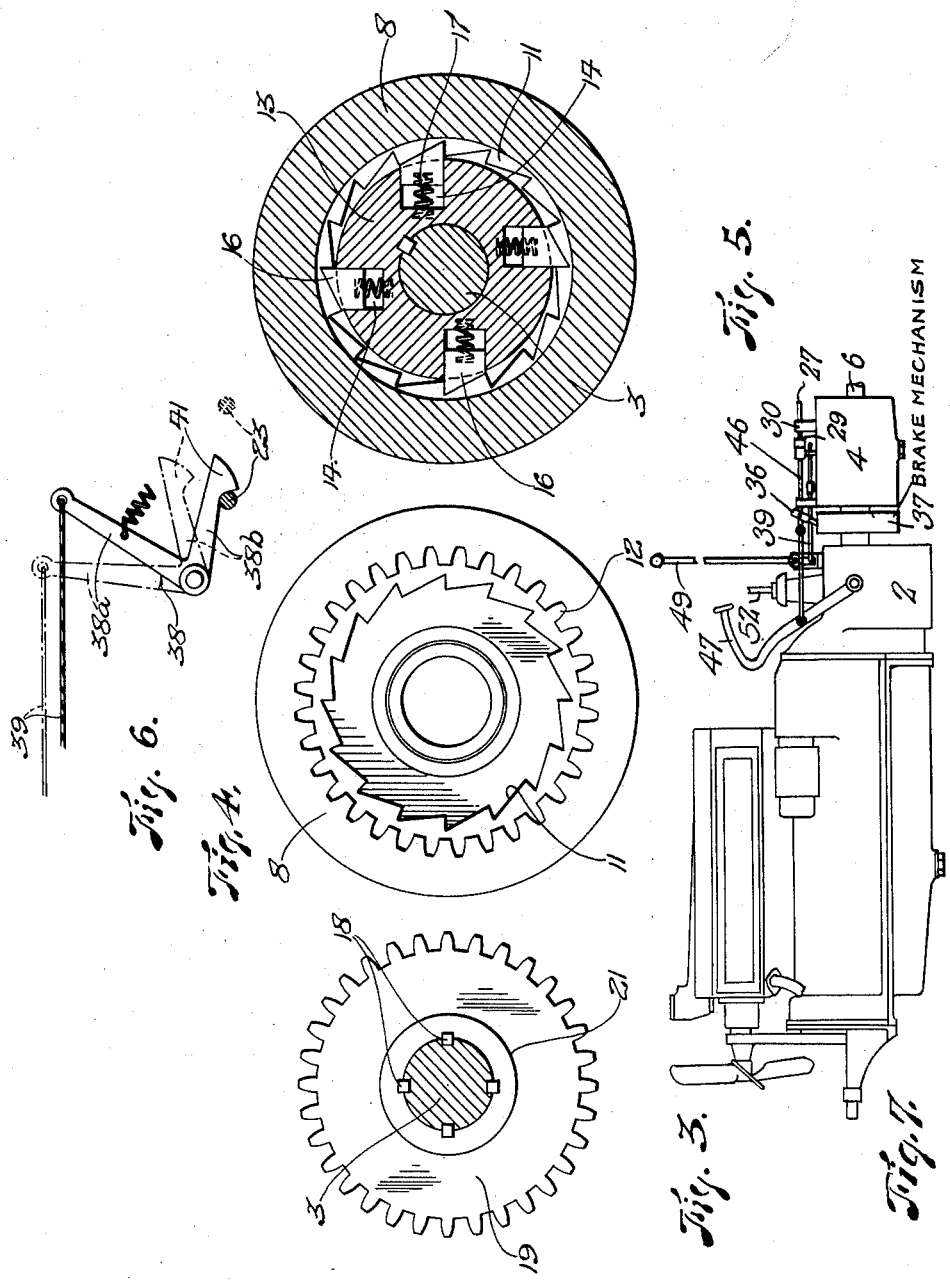

Patented June 5, 1934

1,962,064

UNITED STATES PATENT OFFICE 1,962,064

MEANS FOR SIMPLIFYING THE CHANGING OF THE GEAR RATIO IN AUTOMOBILES

Ralton Flight, East St. Kilda, Victoria, Australia

Application November 26, 1930, Serial No. 498,488
In Australia July 10, 1930

3 Claims. (Cl. 192—18)

This invention relates to automobiles provided with transmission or change speed mechanism of the selective sliding gear type and has for its general object to provide simple and effective means for simplifying the changing of the gear ratio, more specifically to enable gear changes to be effected silently and if desired unhurriedly.

At present in automobiles having transmission mechanism of the type indicated it is well understood that owing to the driven shaft of the transmission mechanism being permanently coupled to the propellor shaft, the changes of gear ratio must be effected whilst one or more of the gear wheels of the transmission are rotating. This gives rise to difficulties in effecting the change, especially if the driver is inexperienced and is also a frequent source of noise annoying to the occupants of the vehicle and others in the vicinity.

The present invention aims to overcome the above disadvantages by providing simple and effective means whereby during the changing of the gear ratio the various gears or rotary parts of the transmission mechanism are held stationary and the driven shaft of the mechanism is freed from the propeller shaft.

Preferably I provide a braking device adapted to come into action upon the driven shaft of the transmission mechanism automatically upon declutching or letting out of the engine clutch. I also arrange for the driven shaft of the transmission to be disconnected from the propeller shaft whilst the engine clutch is disengaged. These features enable the sliding gear of the transmission to be easily enmeshed with its desired companion gear while the latter is stationary, and, owing to the disconnection of the propeller shaft from the transmission, the vehicle proceeds by its own momentum until the drive is again taken up at the new gear ratio.

A practical embodiment of the invention is illustrated in the accompanying drawings wherein, Figure 1 is a part sectional elevation of a device according to the invention showing the parts in their normal positions.

Figure 3 is a face view of a toothed coupling member which is rotatable with and axially slidable upon the driven shaft of the transmission.

Figure 4 is a face view of a double toothed member on the inner end of the propeller shaft.

Figure 5 is a cross sectional view taken on the line V—V of Figure 1.

Figure 6 is a view of lever mechanism for maintaining the toothed coupling member of Figure 4 out of engagement with its co-acting toothed member when it is desired to change the gear ratio.

Figure 7 is an elevation showing the improved mechanism operatively applied to an automobile engine.

Figure 1:
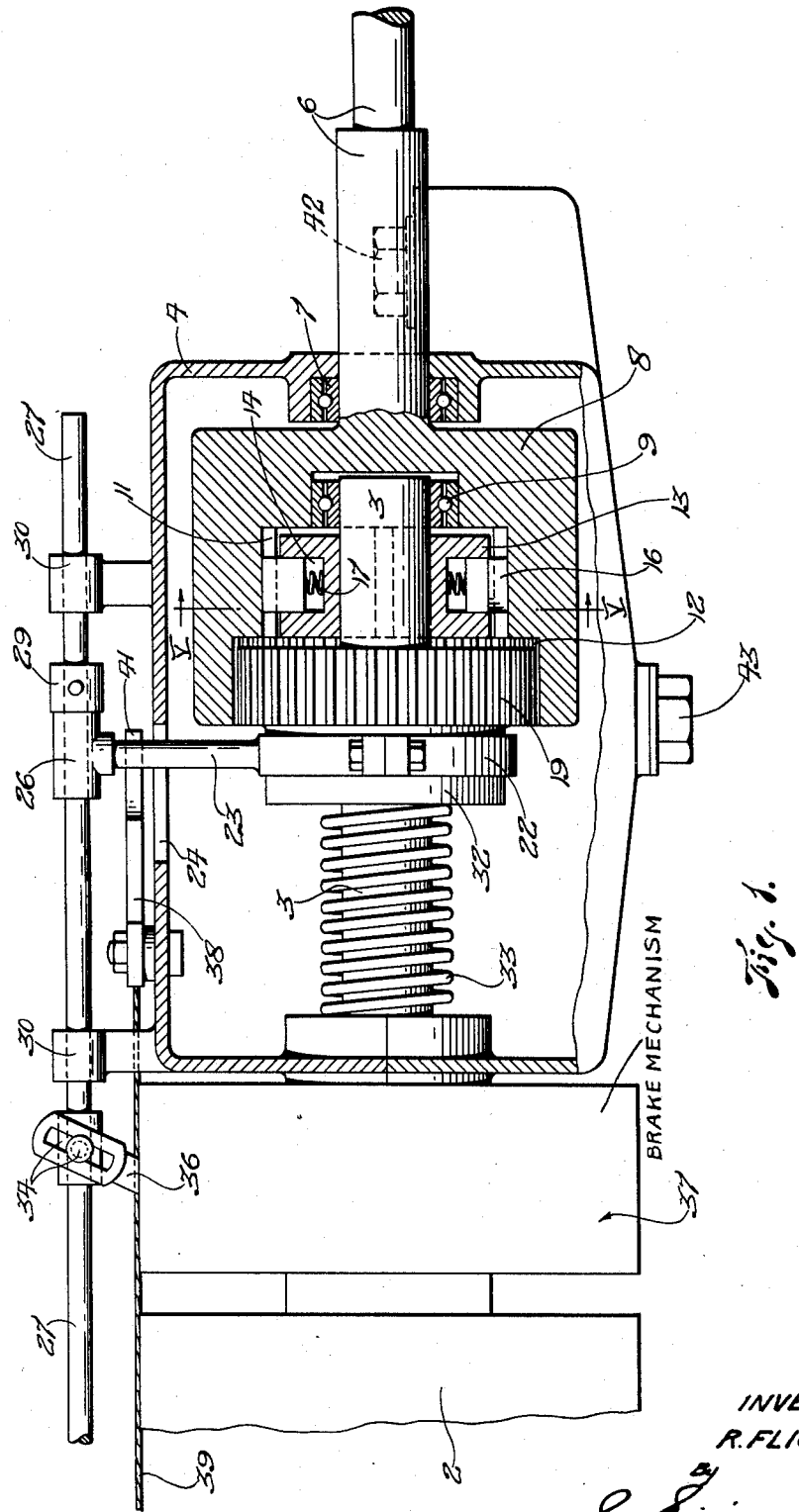

In the drawings the numeral 2 indicates the casing of the transmission or change speed mechanism, and 3 the outer end of the driven shaft of the mechanism.

According to the illustrated form of the invention a second casing 4 is suitably supported in rear of casing 2. The casing 4 has aligned openings at its ends to pass the adjacent ends of shaft 3 and the propeller shaft 6. Ball bearings 7 may be fitted within these openings. The inner end of the propeller shaft located within casing 4 may be enlarged or having an enlarged member 8 secured thereto. This enlarged member is preferably of somewhat ring or annular form and may have a ball bearing 9 to support the rear end of shaft 3.

The member 8 is also provided with an internal ratchet toothed face 11 and an internal spur toothed face 12. The shaft 3 has a collar 13 suitably secured thereon and provided with radial slots 14 in which pawls 16 are housed and partially projected by springs 17 against the ratchet toothed face 11.

The shaft 3 may be splined or provided with feather keys 18 to receive a toothed wheel 19 which thus rotates with the shaft 3 and is slidable axially thereon into and out of engagement with the internal toothed face 12 of member 8.

The slidable toothed wheel 19 may have an annular face 21 to receive a ring shaped lower end 22 of an operating arm 23 which passes upwardly through a longitudinal slot 24 in the top of casing 4 and is provided at its upper end with an apertured head 26 through which a rod 27 freely extends. This rod is provided with an adjustably fitted striker 29, at one side of the head 26, and is guided by bearing brackets 30 upstanding from casing 4. The forward end of rod 27 is connected to the pedal of the engine clutch.

A ball bearing 31 may be fitted between the annular face 21 of wheel 19 and the lower end of arm 23 which may be retained to wheel 19 by a lock nut 32.

A compression spring 33 encircles shaft 3 between the front face of wheel 19 and the front end of casing 4 or the local bearing 7.

The rod 27 has a pin and slot or like connection 34 with a brake lever 36 adapted to actuate a brake 37 on the shaft 3. This brake may be of any known or suitable form.

Figure 2:
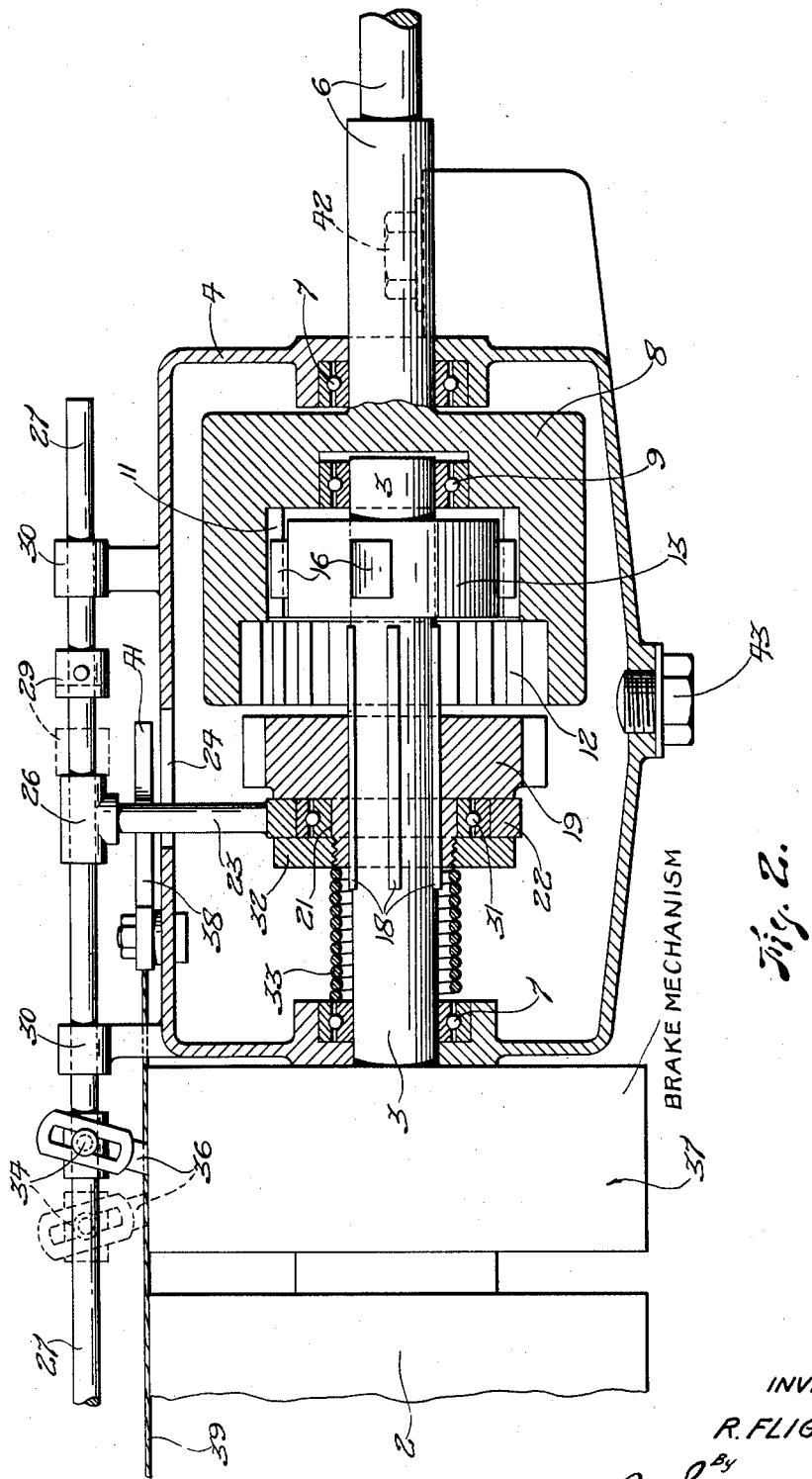
Figure 2 is a view similar to Figure 1 but showing the parts of a coupling for connecting the transmission shaft and the propeller shaft disconnected, and indicating other parts by broken lines in the positions they assume when the engine clutch is disengaged.

In the normal or nonchange position the wheel 19 will be enmeshed with the toothed face 12 of member 8 and the brake 37 will be inoperative as seen in Figure 1 so that transmission will take place in the usual manner. When disengaging the engine clutch preparatory to a change of gear ratio the rod 27 will move forwardly causing the rear striker 29 as indicated by broken lines in Figure 2 to shift arm 23 and disengage the wheel 19 from the coacting toothed face 12 as seen in Figure 2. The clutch should, however, be completely disengaged before wheel 19 is completely freed from face 12. Immediately after disengagement of wheel 19 the brake 37 comes into action, as indicated by broken lines in Figure 2, thereby bringing the various rotary elements of the transmission mechanism, including shaft 3, to rest. In this condition the desired change of gear ratio may be easily and silently effected by manipulation of the change gear lever in the usual manner. During this period the propeller shaft 6 is able to continue rotation in a forward direction by the ratchet 11 riding over the pawls 16.

The sliding wheel 19 may be temporarily maintained in the position shown in Figure 2 against the influence of spring 33 by means of a spring pulled trip lever 38 pivoted on casing 4. One arm 38a of this lever (see Figure 6) may be attached to a cable 39 or like actuating means whilst the other arm 38b may terminate in a hook like outer end 41 adapted to automatically engage behind arm 23 when the wheel 19 is disengaged.

With particular reference to Figure 7, the front end of rod 27 is shown connected by a link 46 to the clutch pedal 47, while the front end of cable 39 is attached to a bell crank lever 48 connected by a rod or line 49 to an operating lever 51 pivoted to the gear change lever 52 near the head thereof.

When the engine clutch is re-engaged following the change of gear ratio, the rod 27 moves rearwardly while wheel 19 will remain disengaged as in Figure 2 until the arm 23 is released from the hooked arm 38b of lever 38 by manipulation of cable 39 whereupon spring 33 will assert itself and move wheel 19 into engagement with the toothed face 12 as in Figure 1.

When the vehicle is being driven rearwardly, the wheel 19 must be engaged with the toothed face 12 and this may be readily effected by the driver operating lever 51 when selecting the reverse gear, thereby moving the cable 39 forwardly and releasing arm 23 so that the wheel 19 may mesh with the face 12 just before the engine clutch is engaged.

The casing 4 may be charged with lubricant by way of a filler opening closed by a plug 42, while a drain opening with plug 43 may be provided in the bottom of the casing.

In applying the invention to existing automobiles the existing driven shaft of the transmission will require to be lengthened or provided with the extension 3, and the propeller shaft shortened and the forward part thereof designated 6 in the drawings connected to the rear part by the usual universal joint.

In incorporating the invention to new automobiles a similar arrangement may be adopted although if desired the casing 4 may be eliminated and the parts shown therein arranged at the rear of the casing 2 which may be enlarged for such purpose.

Having now described my invention what I claim as new and desire to secure by Letters Patent is—

1. In an automobile having selective sliding gear type transmission means normally connected to the engine by a clutch, a toothed member rotatable with and axially slidable on the driven shaft of the transmission into and out of engagement with a coactive toothed member which is carried by the forward end of a propeller shaft, a free wheel device associated with the transmission shaft and the propeller shaft permitting the latter to overrun forwardly, a brake associated with said transmission shaft, means operable by declutching the engine from the transmission for automatically disconnecting said toothed members and applying said brake, means for holding said axially slidable toothed member out of engagement with its cooperating toothed member following a change of gear ratio until after the brake has been released and the clutch has been re-engaged, and means for tripping said holding means.

2. In an automobile having selective sliding gear type transmission means normally connected to the engine by a clutch, a toothed member rotatable with and axially slidable on the driven shaft of the transmission into and out of engagement with a coactive toothed member which is carried by the forward end of a propeller shaft, a free wheel device associated with the transmission shaft and the propeller shaft permitting the latter to overrun forwardly, a brake associated with said transmission shaft, means operable by declutching the engine from the transmission for automatically disconnecting said toothed members and applying said brake, a spring tending to urge said axially slidable toothed wheel into engagement with its cooperating toothed member, and manually releasable means acting in opposition to said spring for holding said slidable toothed member out of engagement with its coacting member.

3. In an automobile having selective sliding gear type transmission means normally connected to the engine by a clutch, a toothed member rotatable with and axially slidable on the driven shaft of the transmission into and out of engagement with a coacting toothed member which is carried by the forward end of the propeller shaft, an operating lever slidably carried on a rod and adapted to slide said toothed member into and out of operating position, said rod being slidably supported and operated by the clutch, strikers on said rod engaging and operating said lever to actuate said toothed member, and means carried by said rod operating a brake to prevent motion of the driven shaft when the clutch is disengaged.

RALTON FLIGHT.